United States Patent [19]

Muller et al.

[11] 3,724,213
[45] Apr. 3, 1973

[54] FUEL SYSTEM, IN PARTICULAR FOR ROCKET ENGINES

[75] Inventors: Wolfgang Muller, Mockmuhl; German Munding, Bad Friedrichshall, both of Germany

[73] Assignee: Messerschmitt-Bolkow-Blohm Gesellschaft mit beschrankter Haftung, Ottobrunn near Munich, Germany

[22] Filed: Dec. 3, 1971

[21] Appl. No.: 204,648

[30] Foreign Application Priority Data

Dec. 4, 1970  Germany..................P 20 59 583.2

[52] U.S. Cl..................................60/39.27, 60/240
[51] Int. Cl.................................................F02c 9/08
[58] Field of Search...60/39.27, 39.29, 39.82 C, 240, 60/39.06, 299, 301, 39.68, 37

[56] References Cited

UNITED STATES PATENTS

| | | | |
|---|---|---|---|
| 799,856 | 9/1905 | Lemale | 60/39.82 C |
| 2,971,340 | 2/1961 | Green | 60/39.82 C |
| 3,062,004 | 11/1962 | Dooley | 60/39.27 |
| 3,126,701 | 3/1964 | Henderson | 60/240 X |

*Primary Examiner*—Clarence R. Gordon
*Attorney*—John J. McGlew et al.

[57] ABSTRACT

The fuel system includes a series connection of a fuel reservoir, containing at least one monergolic fuel, a catalyst for fuel decomposition, and a decomposition gas chamber. There may be two or more such series connections depending upon the number of monergolic fuels involved. A multi-part capillary body is interposed between each fuel reservoir and the catalyst, and at least one part of each capillary body is mounted for displacement in a direction to control the flow cross-sectional area for the fuel. The movable capillary body part may be suspended inside a housing by means of a control diaphragm subjected to the prevailing decomposition gas pressure, on one side, and to a counterpressure, such as a spring pressure, on the other side. Both the catalyst and the movable capillary body part may be suspended by two diaphragms forming a chamber for the decomposition gases escaping from the catalyst. Alternatively, the movable part of the capillary body may be a slide programmed by mechanism controlled by cams.

8 Claims, 2 Drawing Figures

FUEL SYSTEM, IN PARTICULAR FOR ROCKET ENGINES

FIELD OF THE INVENTION

This invention relates to fuel systems, in particular for rocket engines, and, more particularly, to an improved operationally safe fuel system of simple design and employing capillary fuel conveyance.

BACKGROUND OF THE PRIOR ART

As disclosed in U. S. Pat. No. 2,926,492, the monergol, in gas generators driven by monergolic fuels, is split up or decomposed by a catalyst into decomposition gases, and then introduced to a thrust nozzle, a turbine, or another consumer.

It is known further, from AIAA Report No. 68–556, of Oct. 14, 1968, to convey the fuel, in monergolic fuel-driven steering engines for the attitude control of missiles and satellites, by means of an inert pressure medium to the catalyst which splits up the monergol into decomposition gases, which charge the steering nozzles located downstream. This conveying system has the disadvantage that, when the steering engine is laid out as a pulsing engine, the frequency of the pulsations is too low for applications involving special requirements, due to the inertia of the conveying system and, in particular, due to the catalytically caused retardation of the generation of decomposition gas.

To eliminate this deficiency, there has been installed, between the catalyst and the steering nozzles, a removal or receiving tank for the decomposition gases, with the nominal pressure level being controlled by a control circuit in such a manner that, when the pressure drops below the nominal pressure, equivalent to the operating pressure of the steering nozzles, monergol is conveyed into the catalyst until the nominal pressure in the decomposition gas tank is restored.

However, even this equipment, which is a so-called plenum system, is afflicted with various deficiencies and functional problems. On the one hand, it requires a control circuit which is expensive with respect to susceptible pressure control elements and, on the other hand, it still requires a pressure medium to convey the monergol to the catalyst. This is usually in inert gas which consumes not only valuable assembly space but also weight for the tank structure. Naturally, such weight is at a premium.

Furthermore, in order to achieve an even higher pulsing frequency, also towards the exhaustion of the fuel supply, which means, in order to assure very fast conveyance of fuel to the catalyst, it is necessary to keep the pressure level of the conveying gas at least approximately constant over the entire operating period. This is accomplished by the additional storing or generation of additional pressure gases, for example from powder charges, and replenishing of the conveying tanks. However, this is expensive from the design standpoint, and again necessitates use of valuable space and weight.

SUMMARY OF THE INVENTION

The objective of the present invention is to eliminate the deficiencies of known systems and to provide an operationally safe fuel system of simple design, employing capillary fuel conveyance.

In accordance with the invention, there is provided, between the fuel reservoir and the catalyst, a multi-part capillary body, one part of which is designed to be movable or displaceable for the control of the flow cross-sectional area for the fuel.

In one embodiment of the invention, the movable part of the capillary body is associated with the catalyst, and both the movable part and the catalyst are suspended inside a housing by means of a control diaphragm subjected, on one side, to the respectively prevailing pressure of the decomposition gas, which is the nominal or actual pressure, and subjected, on the other side, to a counterpressure matching the nominal pressure.

In order to keep the partial amount of monergol remaining in the movable part of the contact body and still flowing to the catalyst, where additional decomposition gases are generated in an undesired manner, as small as possible, when the contact between the fixed and movable part of the contact body is broken, the movable part of the capillary body, associated with the catalyst, is kept very thin with respect to its flow-through distance, in accordance with the design embodying the invention.

As a further development of the invention, the catalyst and the movable part of the capillary body are suspended by another diaphragm, both diaphragms cooperating to form the tank or container for the decomposition gas escaping from the catalyst.

Additionally, in accordance with the invention, the part of the multi-part capillary body controlling the flow cross-sectional area for the fuel, is a slide.

The invention makes possible advantages applications of capillary conveyance, known as such, inasmuch as such applications can be incorporated into a controlling or regulating circuit by simple structural means, it being possible to devise structurally simple controlling or regulating circuits with operationally safe switching elements and control members, by splitting the capillary body into parts which can be moved toward or away from each other, in conjunction with controlling the movable part of the capillary body as a function of certain variables of state or function, or through a predetermined operating program.

In a drive system with steering engines supplied from a tank filled with catalytically produced decomposition gases, the pressure level, or the occurring pressure difference between nominal and actual pressure, in this tank is utilized as the controlling factor for making or breaking contact between the movable and fixed parts of the capillary body. The split capillary body, embodying the invention, is used as a contact device so that a special control valve to control the fuel flow is not required.

An object of the invention is to provide an improved fuel system, particularly for rocket engines.

Another object of the invention is to provide such a fuel system which is operationally safe and of simple design.

A further object of the invention is to provide such a fuel system employing capillary fuel conveyance.

Another object of the invention is to provide such a fuel system in which a multi-part capillary body is interposed between a fuel reservoir and a catalyst, and has one part which is displaceable to control the flow cross-sectional area for the fuel.

For an understanding of the principles of the invention, reference is made to the following description of typical embodiments thereof as illustrated in the accompanying drawing.

DESCRIPTION OF THE PREFERRED EMBODIMENTS

Figure 1:
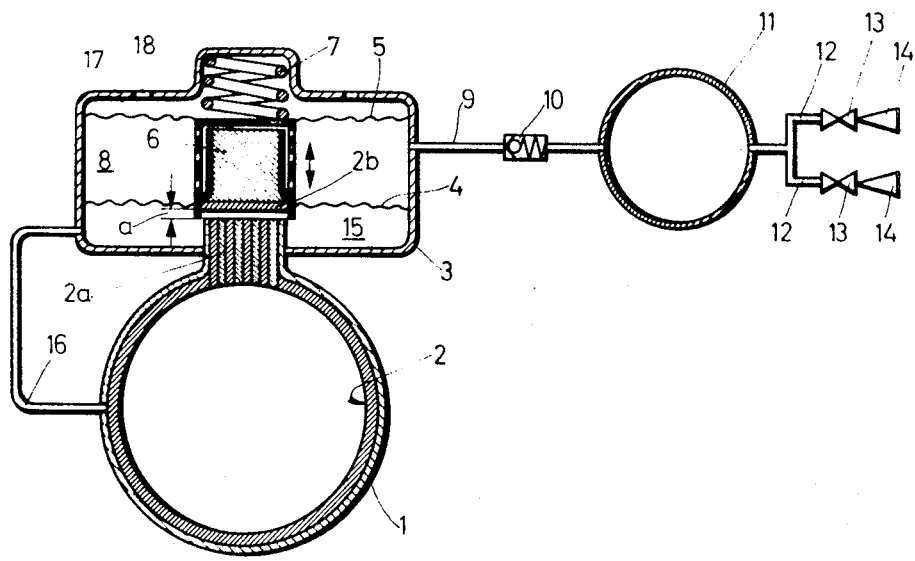
FIG. 1 is a somewhat schematic cross-sectional view illustrating one embodiment of the fuel system in accordance with the invention.

Referring to FIG. 1, the drive system illustrated therein comprises a tank 1, for a fuel monergol, which is lined with a capillary body 2 having an extension 2a which projects into a housing 3. Two spaced diaphragms 4 and 5 are mounted in housing 3 and suspend a capillary body 2b and a catalyst 6. In the arrangement of FIG. 1, diaphragm 5 functions as a control diaphragm so that its side facing diaphragm 4 has the pressure of the decomposition gases applied thereto, whereas its other side or outer surface, or the outer face of catalyst 6 which is flush with the outer surface of diaphragm 5, is subjected to the bias of a pressure equalizing spring 7. The bias of spring 7, in the illustrated position, matches the nominal pressure applied to the inner surface of diaphragm 5, so that equilibrium prevails at the control diaphragm. Under these conditions, a free space $a$, or an interruption between the fixed part 2a and the movable part 2b of the capillary body, exists.

Chamber 8, defined between diaphragms 4 and 5, is used as a collecting chamber for the decomposition gases escaping from catalyst 6. A line 9, having a check valve 10 incorporated therein, extends from chamber 8 to a decomposition gas tank or chamber 11, to which steering nozzles 14 are connected through lines 12 having incorporated therein control valves 13. Chamber 15, beneath diaphragm 4, communicates with fuel reservoir 1 through a pressure equalization line 16. In addition, apertures 18 provide communication between the spring assembly space 17 and the exterior of housing 3.

The mode of operation of the embodiment of the invention shown in FIG. 1 will now be described. As already mentioned, when the decomposition gas tank or receiver 11 is filled with decomposition gases to its nominal pressure level, there prevails an equilibrium of forces at the control diaphragm 5. This means that there is the free space $a$ between part 2a and part 2b of the capillary body, so that the capillary flow path for the liquid monergol is interrupted between reservoir 1 and catalyst 6. If a sufficient amount of decomposition gas is consumed by placing steering nozzles 14 in operation, so that the pressure in decomposition gas receiver or container 11 falls below the predetermined nominal pressure level, then the force of spring 7 predominates over the pressure force. Consequently, capillary body part 2b is brought into contact with capillary body part 2a, whereupon monergol can flow to catalyst 6.

Due to the further generation of decomposition gases in catalyst 6, the pressure in chamber 8, or in decomposition gas receiver 11, respectively, again increases. When the nominal pressure is attained, the distance or spacing $a$ is reestablished and contact between capillary body parts 2a and 2b is reduced to a point where there is no further supply of monergol to catalyst 6. In order to keep the quantity of monergol remaining in movable capillary body part 2b as small as possible, when contact between fixed part 2a and movable part 2b of the capillary body is interrupted, and which quantity flows to the catalyst where additional decomposition gases are generated in an undesired manner, movable capillary body part 2b designed to be very short or very small with respect to its flow-through distance or volume, respectively.

Figure 2:
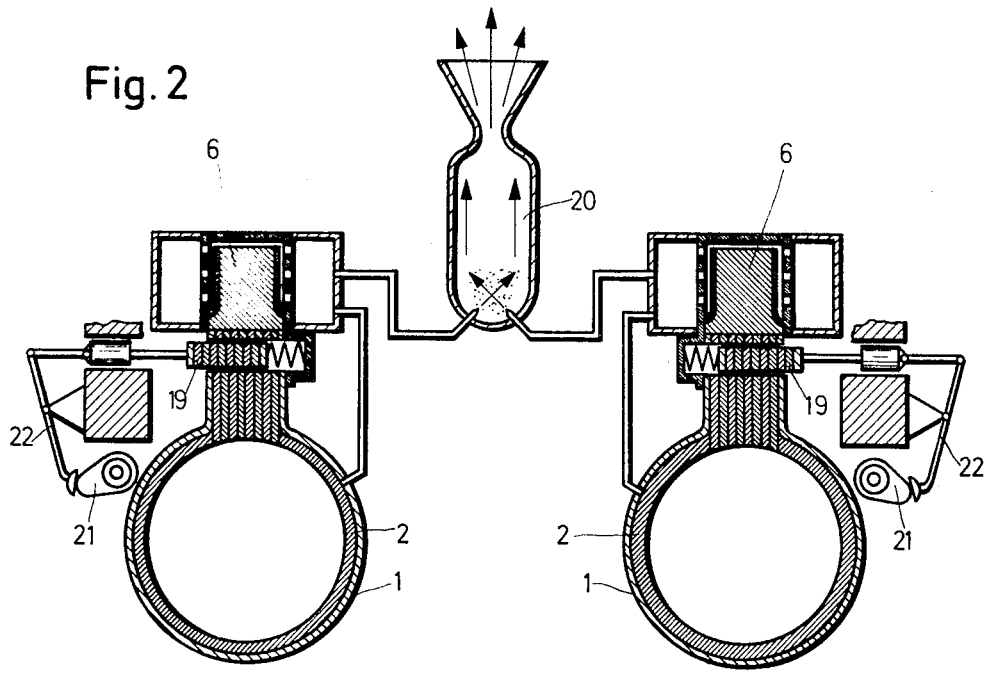
FIG. 2 is a view, similar to FIG. 1, illustrating another embodiment of the fuel system.

In the embodiment of the invention shown in FIG. 2, the flow of monergol through capillary body 2 is controlled by a slide 19 made of capillary material, or the flow quantity is varied, with the full flow-through cross-sectional area being open when slide 19 is moved in completely, while the flow through the capillary body 2 is completely interrupted when slide 19 is moved out completely. In this embodiment of the invention, there are two monergol reservoirs 1 each associated with a respective catalyst 6 and supplying gases to a common combustion chamber 20 where the monergols interact. One of the reservoirs may contain a fuel monergol and the other an oxygen monergol. The decomposition gases generated by each catalyst 6 from the associated monergols stored in the respective reservoirs 1 are supplied to the combustion chamber 20.

It is possible, by means of control cams 21 and positioning levers 22, to position control slides 19 to obtain, for the combustion chamber process, certain performance programs throughout the operating period.

While specific embodiments of the invention have been shown and described in some detail to illustrate the application of the principles of the invention, it will be understood that the invention may be embodied otherwise without departing from such principles.

What is claimed is:

1. In a fuel system, particularly for rocket engines such as steering engines for attitude control of missiles and satellites, including at least one fuel reservoir, containing at least one monergolic fuel, at least one decomposition gas chamber, and at least one catalyst, for fuel decomposition, interposed between and in communication with the fuel reservoir and the decomposition gas chamber; the improvement comprising, in combination, a multi-part capillary body interposed between each fuel reservoir and the catalyst in series therewith; and means mounting at least one part of each capillary body for displacement in a direction to control the flow cross-sectional area for the fuel monergol.

2. In a fuel system, the improvement claimed in claim 1, in which the movable capillary body part is associated with the catalyst; and a control diaphragm conjointly suspending the movable capillary body part and the catalyst; one surface of said control diaphragm being subjected to the respectively prevailing decomposition gas pressure, representing the nominal or actual pressure, and the other surface of said control diaphragm being subjected to a counterpressure matching the nominal pressure.

3. In a fuel system, the improvement claimed in claim 2, in which the movable capillary body part associated with the catalyst is very thin.

4. In a fuel system, the improvement claimed in claim 1, including a pair of spaced diaphragms defining therebetween a decomposition gas chamber for the decomposition gases escaping from said catalyst; said catalyst and the movable capillary body part being suspended from said diaphragms; one of said diaphragms comprising a control diaphragm having its surface facing the other diaphragm subjected to the respectively prevailing decomposition gas pressure, which is a nominal or actual pressure, and its opposite surface being subjected to a counterpressure matching the nominal pressure.

5. In a fuel system, the improvement claimed in claim 4, in which the counterpressure is provided by a compression spring engaging the outer surface of said control diaphragm.

6. In a fuel system, the improvement claimed in claim 5, including a housing in which said two diaphragms are mounted, the space in said housing outwardly of said control diaphragm communicating with the exterior of said housing; and a pressure equalization line interconnecting the space in said housing outwardly of the other diaphragm, to said fuel reservoir.

7. In a fuel system, the improvement claimed in claim 1, in which said movable part of said capillary body is a laterally displaceable slide.

8. In a fuel system, the improvement claimed in claim 7, in which there are two fuel reservoirs each having a respective catalyst associated therewith and the two catalysts being connected to a combustion chamber constituting the decomposition gas chamber; one reservoir containing a fuel monergol and the other reservoir containing an oxygen monergol; and programming means controlling displacement of the two slides.

* * * * *